United States Patent Office 2,951,865
Patented Sept. 6, 1960

2,951,865

HIGH DIELECTRIC CONSTANT FLUIDS AND PLASTICIZERS

Mary S. Jaffe, Cleveland Heights, and Robert V. Levetan, Twinsburg, Ohio, assignors to General Electric Company, a corporation of New York No Drawing. Filed Dec. 10, 1957, Ser. No. 701,720

5 Claims. (Cl. 260—465)

This invention relates to new organic compounds consisting of esters of cyclic dicarboxylic acids and suitable for use as high dielectric constant fluids and plasticizers. These compounds are valuable as high-temperature lubricants, as electrical fluids of high dielectric constant and low-power factor for use as transformer oils, and as impregnants in electrical capacitors, and as plasticizers for plastic films used in capacitors. They are particularly useful for increasing the dielectric constant of the organic plastic matrix in which the phosphor of an electroluminescent cell is embedded.

A conventional electroluminescent cell comprises a phosphor embedded in a dielectric matrix sandwiched between a pair of conducting layers at least one of which is transparent or at least light transmitting. For instance, in Patent 2,774,004, Jaffe, "Flexible Electroluminescent Laminated Panel," the electroluminescent cell comprises a layer of an electroluminescent phosphor dispersed in a matrix of organic material sandwiched between an aluminum foil on one side and a light-transmiting conductive sheet of glass fibers coated with an indium containing compound on the other side. When an alternating voltage is applied across the conductive layers, the phosphor produces light which is transmitted through the fibrous glass sheet. The plastic matrix binds the phosphor in place and permits laminating the various component layers of the cell together.

It is well recognized that the higher the dielectric constant of the matrix relative to the phosphor, the more the electric field will be concentrated across the phosphor crystals, and the greater will be the amount of light produced for the same voltage, phosphor and cell construction. High dielectric constant plastics can be of two types:

(1) Those in which the plastic contains a heavy atom such as bromine or iodine whose electron shells are readily polarized or deformed by an electric field, and (2) Those in which a charged or polar group exists on a movable chain or branch of the molecule.

Type (1) is of limited usefulness for electroluminescent cells as presently made using zinc sulfide phosphors because halogens such as chlorine, bromine and iodine are harmful to these phosphors.

The effectiveness of type (2) high dielectric constant plastics is theorized to be due to the tendency of the polar branch of the molecule to follow the electric field as it alternates. The array of oriented or partially oriented polar molecules gives an electric moment per unit volume to the material which results in a higher dielectric constant. In following the field, the polar branch must work against the viscous resistive forces of neighboring molecules. If the viscous forces are too high, as where the plastic exists in a crystalline or quasi-crystalline state, the polar branches or dipoles cannot follow the field and the plastic will fail to develop the dielectric constant that might be expected from its chemical nature. For example, pure poly-acrylonitrile has a fairly low dielectric constant despite the fact that it contains many extremely polar nitrile groups (—C≡N).

Plasticizers may develop the potential dielectric constant of a plastic, that is the dielectric constant anticipated by reason of the presence of extremely polar branches, by lubricating the molecules, that is by reducing the viscous resistive forces between neighboring molecules and permitting the dipoles to orient in the electric field. A plasticizer may be defined as a high boiling, non-drying solvent for a plastic. Plasticizers are added to many resins in order to make them soft and pliable. In order for a material to be useful as a plasticizer for a particular resin, it is necessary that it be compatible with the resin and not exude or sweat out on aging, leaving the resin unplasticized. Plasticizers may be used in resins in varying amounts. Since the plasticizer may form a very substantial part of the organic matrix, the dielectric constant of the plasticizer may have a substantial effect on the dielectric constant of the matrix entirely apart from its lubricating function. It is therefore desirable to have a plasticizer which will perform its useful lubricating function whereby to develop the potential dielectric constant of the plastic and which will at the same time itself contribute to the dielectric constant of the mixture instead of being merely an electrically inert diluent.

The general object of the invention is to provide high dielectric constant plasticizers suitable for developing the potential dielectric constant of a plastic and which will, at the same time, have of themselves a high dielectric constant whereby to contribute to the overall dielectric constant of the mixture.

In copending application Serial No. 701,907 filed of even date herewith of Mary S. Jaffe, entitled "Matrix for Electroluminescent Cells" and assigned to the same assignee as the present invention, there is described an organic polymeric matrix suitable for the phosphor layer of an electroluminescent cell and consisting principally of a cyanoethylated polyglucoside such as cyanoethyl cellulose. This material is also suitable as a matrix for an insulating layer of barium titanate or other high dielectric constant inorganic material which it is desirable to interpose between the phosphor layer and one of the conductive layers of an electroluminescent cell. It is also suitable for the matrix of a dispersion of barium titanate or other high dielectric constant powder for use in making electric capacitors. A more specific object of the present invention is to provide a plasticizer particularly suitable for enhancing the dielectric constant of a cyanoethylated polyglucoside polymeric matrix.

Yet other objects of the invention are to provide high dielectric constant fluids suitable for use as electrical fluids in transformers and electrical capacitors.

In accordance with the invention, we have found a new series of organic compounds fulfilling the above objects and consisting of esters of phthalic acid in which the alcohol contains a cyanoalkyl group —R—C≡N where R stands for —$C_nH_{2n}$— such as the cyanoethyl group —$C_2H_4CN$ and homologues thereof, both branched and straight chain.

One such compound embodying the invention is di-α-cyanoethyl phthalate, represented structurally by:

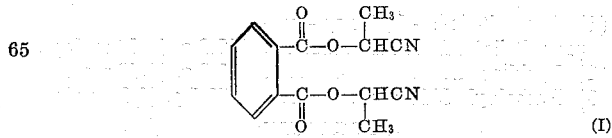

(I)

This ester has been prepared by the reaction of phthalic anhydride and lactonitrile (α-hydroxypropanenitrile) in the presence of a suitable catalyst. A preferred method is to use the acid chloride (phthaloyl chloride) in place of the acid anhydride and perform the reaction in the presence of an acid-accepting compound such as pyridine or a tertiary amine. The compound may also be prepared, but in poorer yield, by the method of ester exchange, for instance by heating dimethyl phthalate with lactonitrile and removing the evolved methanol. It may also be formed in an indirect manner in which the nitrile group is attached to the alcohol portion after esterification.

Another such compound is di-β-cyanoethyl phthalate, represented structurally by:

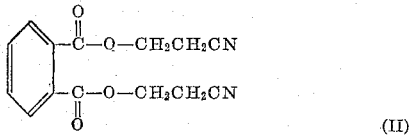

(II)

This ester has been prepared by the reaction of phthallic anhydride and hydracrylonitrile (β-hydroxypropanenitrile) in the presence of a suitable catalyst, and may also be made in analogous manner to di-α-cyanoethyl phthalate (I).

Both esters I and II have been prepared and purified, and their physical properties and C, H and N analysis determined. After distillation, they are colorless, odorless, viscous fluids of very high boiling point. On long standing the purified oils slowly crystallize to white crystals which melt in the temperature range from 53 to 59° C. No crystallization is observed when I or II are used in plastic formulations. The empirical formulae in both cases are $C_{14}H_{12}N_2O_4$. The following table shows the results of experimental analyses as compared to values calculated from the assigned formulae. The assigned structures I and II are confirmed by infrared spectra.

TABLE I

| | Found | Calculated |
|---|---|---|
| Percent C | 63.20 | 61.76 |
| Percent H | 4.63 | 4.41 |
| Percent N | 10.37 | 10.29 |
| Molecular Weight g | 277 | 272 |

Both products successfully plasticize formulations based on cyanoethylcellulose.

Electrical properties as determined by capacitance measurements on a high voltage bridge are as follows:

TABLE II

| Compound | -K' | K'' | Tan δ | Power Factor |
|---|---|---|---|---|
| di-α-cyanoethyl phthalate | 19.7 | 0.27 | 0.014 | 0.014 |
| di-β-cyanoethyl phthalate | 18.0 | 9.1 | 0.506 | 0.45 | where
$K'$ = dielectric constant—real part.
$K''$ = dielectric constant—imaginary part.
$\delta$ = dielectric—loss angle.

The following examples of the invention are offered for purposes of illustration and are not to be considered as limitative. The proportions are given on a weight basis unless otherwise specified.

*Example 1.—Preparation of di-α-cyanoethylphthalate*

MATERIALS (1) Lactonitrile(α - hydroxy - propanenitrile) _____ 112.9 g. (1.59 moles)
(2) Pyridine _____ 132.8 g. (1.68 moles)
(3) Phthaloyl Chloride _____ 170.5 g. (0.84 mole)

PROCEDURE

The lactonitrile and pyridine were placed in a three-necked flask equipped with a stirrer, dropping funnel and thermometer and a quantity of dry chloroform added. The mixture was then cooled to approximately −15° C. The phthaloyl chloride mixed with dry chloroform, was then added slowly over a period of 1 to 1½ hours, while maintaining the temperature at less then −10° C. and stirring vigorously. The resultant solution was warmed slowly to room temperature and allowed to stand overnight.

The resultant reaction solution was purified by successive extractions with water, dilute acid and dilute base solutions followed by thorough drying over a desiccant. The dry solution was decolorized with activated charcoal, and then the solvent was stripped off by distillation.

The product α-cyanoethylphthalate was then a viscous pale yellow oil which was brought to a final stage of purity by distillation in a suitable high vacuum molecular still. The final product was then a colorless, odorless, viscous oil of high boiling point and good stability.

Other specific procedures may be used. For example mixtures of phthalic anhydride, lactonitrile, benzene and a suitable catalyst may be refluxed with suitable means provided to separate the water formed in the reaction from the benzene and return the benzene to the reaction flask. Ethylene chloride, pyridine or dioxane may be substituted for the chloroform if desired.

*Example 2.—Preparation of di-β-cyanoethylphthalate (II)*

MATERIALS

Moles
(1) Hydracrylonitrile (β-hydroxypropanenitrile) __ 1.64
(2) Pyridine _____ 1.65
(3) Phthaloyl chloride _____ 0.80

PROCEDURE

The hydracrylonitrile and pyridine were mixed with a quantity of dry chloroform in a three-necked flask equipped with a stirrer, dropping funnel and thermometer and cooled to 0° C. The phthaloyl chloride was mixed with dry chloroform and dropped into the flask with constant stirring over a period of one hour. The temperature was maintained from 0° to −5° C. After all phthaloyl chloride was added, the reaction mixture was allowed to warm to room temperature with stirring and then let stand over night.

The resultant solution was purified by successive extractions with water, dilute acid, and dilute base solutions, followed by thorough drying over a powdered desiccant. The dried solution was stripped of solvent by distillation and the product (II) was brought to a final state of purity by distillation in a suitable molecular still.

The compound may be prepared by other procedures such as refluxing phthalic anhydride with hydracrylonitrile, benzene and a suitable catalyst and separating off the water formed in the reaction with a suitable receiver and returning the benzene to the reaction flask. Other solvents such as ethylene chloride, dioxane or pyridine may be substituted for the chloroform if desired.

Of the two compounds given as examples above, it is seen that the di-α-cyanoethyl phthalate has the higher dielectric constant and the lower power factor. For this reason, it is preferred as a plasticizer for the cyanoethyl cellulose matrix of an electroluminescent cell and it is likewise preferred as an electrical fluid. Cyanoethyl cellulose has a dielectric constant of about 20 and the dielectric constant of di-α-cyanoethyl phthalate at 19.7 is substantially the same. However, a cyanoethyl cellulose matrix plasticizer with di-α-cyanoethyl phthalate develops a dielectric constant exceeding 20. This remarkable result is believed to be due to the reduction in internal viscosity setting the cyanoethyl side chains free to follow the electric field.

The increase in the dielectric constant of the cyanoethyl cellulose matrix depends upon the proportion of cyanoethyl phthalate added as plasticizer, as shown by the following table.

TABLE III

*Effect of α-CNEP plasticizer on dielectric constant of cyanoethyl cellulose*

| Volume Plasticizer | K' | Increase in K', percent | K'' | Tan δ |
|---|---|---|---|---|
| 0% | 20.6 | 0 | 4.41 | 0.214 |
| 33.3% | 24.6 | 19 | 4.43 | 0.180 |
| 50% | 25.4 | 23 | 7.8 | 0.282 |

Tests of electroluminescent cells using the di-α-cyanoethyl phthalate plasticizer of the present invention have confirmed the expectations of higher brightness. The cells were made by first mulling barium titanate to a stiff paste in a small amount of di-α-cyanoethyl phthalate. This paste is then dispersed by mixing into a cyanoethyl cellulose solution which is then applied to an aluminum foil either by spraying or through the use of a doctor blade technique to provide a thin even layer approximately 1 mil thick. The layer is then dried and another layer consisting of electroluminescent zinc sulfide phosphor, likewise dispersed in a cyanoethyl cellulose solution plasticized with di-α-cyanoethyl phthalate, is applied thereover and dried in the same fashion. The electroluminescent cell is then completed by applying a sheet of conducting glass paper over the coated foil and encapsulating the whole between sheets of polyethylene in the manner described in copending application Serial No. 701,906, filed of even date herewith of Elmer G. Fridrich and Paul A. Dell entitled "Electroluminescent Lamp and Manufacture Thereof" and assigned to the same assignee as the present invention. Electroluminescent cells so constructed have shown much higher brightness by comparison with prior cells.

The higher brightness achieved through the use of cyanoethyl phthalate is demonstrated most strikingly by comparing cells wherein the dielectric matrix for the phosphor consists of di-α-cyanoethyl phthalate as an oil, with cells wherein the dielectric matrix consists of the commercially available plasticizer known as Aroclor 1254 of Monsanto Chemical Company consisting of chlorinated biphenyl. Comparative brightness results are given in the following table. The cells were 5 mils thick and operated on 300 volts, 60 cycles A.C.

TABLE IV

| Matrix | Brightness (foot-lamberts) | Ratio |
|---|---|---|
| α-CNEP | 3.9 | 7.12 |
| Aroclor 1254 | 0.55 | |

While the invention has been described with particular reference to cyanoethyl esters of phthalic acid, it will be appreciated that homologues of the cyanoethyl group, namely cyanoalkyl groups, provide in general similar properties and fall within the scope of the invention.

What we claim as new and desire to secure by Letters Patent of the United States is:

1. Di-cyanoethyl phthalate represented by the formula

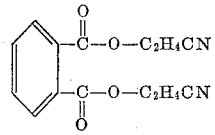

2. Di-α-cyanoethyl phthalate represented by the formula

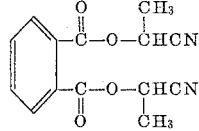

3. Di-β-cyanoethyl phthalate represented by the formula

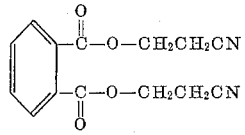

4. The method of preparing di-α-cyanoethyl phthalate which comprises making a mixture of lactonitrile and pyridine in a dry solvent, cooling said mixture to a low temperature, adding thereto slowly and with vigorous stirring phthaloyl chloride in a dry solvent while maintaining the reaction mixture at a low temperature, warming the resultant solution slowly to room temperature, purifying same by successive extractions with water, dilute acid and dilute base solutions, thoroughly drying the resultant reaction solution, and stripping off the dry solvent by distillation.

5. The method of preparing di-β-cyanoethyl phthalate which comprises making a mixture of hydracrylonitrile and pyridine in a dry solvent, colling said mixture to a low temperature, adding thereto slowly and with vigorous stirring phthaloyl chloride in a dry solvent while maintaining the reaction mixture at a low temperature, warming the resultant solution slowly to room temperature, purifying same by successive extractions with water, dilute acid and dilute base solutions, thoroughly drying the resultant reaction solution, and stripping off the dry solvent by distillation.

References Cited in the file of this patent

UNITED STATES PATENTS

| 2,734,071 | Blair | Feb. 7, 1956 |
| 2,750,401 | Lynn | June 12, 1956 |